United States Patent [19]

Appelberg

[11] Patent Number: 4,602,340

[45] Date of Patent: Jul. 22, 1986

[54] INFORMATION DISTRIBUTION SYSTEM

[75] Inventor: Gustaf T. Appelberg, Fairfield, Conn.

[73] Assignee: Research Activities, Incorporated, Fairfield, Conn.

[21] Appl. No.: 427,488

[22] Filed: Sep. 29, 1982

[51] Int. Cl.[4] .................. G05D 27/02; H04M 11/00; H04B 3/54

[52] U.S. Cl. .................. 364/492; 340/310 R; 340/825.52; 368/46

[58] Field of Search .............. 368/46, 47; 340/310 A, 340/310 R, 825.52, 825.72; 364/492, 493, 556

[56] References Cited

U.S. PATENT DOCUMENTS

| 1,871,636 | 8/1932 | Trogner | 368/46 X |
| 2,020,039 | 11/1935 | Nicolson | 368/47 |
| 2,188,145 | 1/1940 | Frantz | 368/47 |
| 3,876,840 | 4/1975 | Bryant, Jr. | 360/12 |
| 3,946,362 | 7/1974 | Sumida et al. | 340/825.52 |
| 4,117,661 | 10/1978 | Bryant, Jr. | 368/47 |
| 4,185,272 | 1/1980 | Feiker | 340/310 R |
| 4,200,862 | 4/1980 | Campbell et al. | 340/310 A |
| 4,204,398 | 5/1980 | Lemelson | 368/47 |
| 4,216,527 | 8/1980 | Emerson et al. | 340/310 A |
| 4,217,646 | 8/1980 | Caltagirone et al. | 340/310 R |
| 4,264,960 | 4/1981 | Gurr | 364/492 |
| 4,386,436 | 5/1983 | Kocher et al. | 340/310 A |
| 4,442,319 | 4/1984 | Treidl | 340/310 R |

FOREIGN PATENT DOCUMENTS 2039402 8/1980 United Kingdom ........... 340/310 A

OTHER PUBLICATIONS

Simplex, 2400 Energy Management System, 1979 Simplex Time Recorder Co., Gardner, Mass., 01441 USA.

Primary Examiner—Felix D. Gruber

[57] ABSTRACT

A system is provided for distributing coded time or other information signals through the electrical gridwork of a facility such as a home, office, factory, or mobile vehicle for purposes of information display and/or control and monitoring of equipment and activities thereof.

8 Claims, 5 Drawing Figures

INFORMATION DISTRIBUTION SYSTEM

FIELD OF THE INVENTION

The present invention relates to systems for the transmission and display of information, in particular time-related information, as well as for the control, monitoring and reporting of equipment, processes and other activities using the transmitted and/or displayed information.

BACKGROUND OF THE INVENTION

U.S. Pat. No. 1,871,636 issued Aug. 16, 1932 describes a system which uses carrier signals imposed on electrical power service lines to provide a plurality of subscribers connected to the service line with an audible chime synchronized with that actually produced by a central, reference chiming clock. The chime of the central, reference clock is picked up by an adjacent microphone, transmitted as a carrier signal over the power service lines and received in the subscriber's location where the chime sound is emitted through a speaker in the subscriber's clock connected to the service line.

U.S. Pat. No. 2,020,039 issued Nov. 5, 1935 describes an electrical signalling system in which two cyclic variable frequency oscillators generate variable frequency outputs of widely different amplitudes from rotors driven at different speeds by the hands of a master clock. The two outputs are transmitted by radio or wire to an amplifier type receiver to which a vibrating reed-time display device is connected. As is apparent, the patented system uses varying frequencies for time code.

U.S. Pat. No. 2,188,145 uses three different groups of frequencies which can be transmitted by radio channel and wire channel, including power, telephone and telegraph wires, to a time display receiver which may comprise a radio receiver and time indicator with vibrating reed elements. This patented system for transmitting and displaying time information is similar to that disclosed in U.S. Pat. No. 2,020,039 discussed in the preceding paragraph.

U.S. Pat. No. 2,671,131 issued Mar. 2, 1954 discloses a television system for remote time indication. In the system, a television transmitter transmits the image of a master clock through a separate television channel to a special television receiver and display.

Finally, U.S. Pat. No. 4,204,398 issued May 27, 1980 describes a system for automatically causing a change in the time displayed by a remote timepiece to bring the time thereof into confirmity with the local time zone. The remote timepiece internally generates a time coded signal representing its individual time computation which signal is in the same language as a transmitted time code reference signal. Periodically, the signals are compared, and if different, the timepiece circuitry itself makes appropriate adjustment to achieve confirmity with the reference. The coded reference signal is transmitted by a short wave transmitter (radio or ultrasonic) modulated with the coded time signal. The timepiece includes a microminiature electronic circuit with a short wave radio or ultrasonic receiver for receiving the transmitted time standard signal.

SUMMARY OF THE INVENTION

The present invention has an object the provision of a novel system for providing a facility with useful time or other information for direct display or for control or monitoring of equipment, activities and the like within the facility.

The invention also has as an object the provision of such a system which can also report on the status and operation of equipment, activities and the like within a facility.

The invention has as another object the provision of such a system which utilizes existing electrical gridwork or circuitry within the facility to achieve such information transmission, display, control, monitoring, and reporting.

The invention has as still another object the provision of such a system which can utilize time or other information generated from a standard source either remote or within the facility serviced by the system.

The invention has as another object the provision of such a system which can replace timing devices, control devices and monitoring devices heretofore used in facilities such as homes, multi-family dwellings, office buildings, factories, mobile vehicles, and the like.

In a typical working embodiment of the invention, the system includes a source of information signals in coded form for transmission. For example, the source of information could be a reference time source located remote or within the facility with a code-generating means, if necessary, to provide the desired coded signal. In particular, the information source could be the so-called Coordinated Universal Time signal transmitted by about thirty radio stations throughout the world based on Greenwich Mean Time in conjunction with a code generating means (formatter) either remote from or within the facility. Or, the information source could be a master clock or other timepiece within the facility in conjunction with a Formatter also within the facility. Furthermore, known sensing and signal-generating devices for pressure, temperature, volume, velocity, density, flow, chemical composition, electrical frequency, voltage or current and other senseable parameters may be used as the information source in conjunction with a code-generating means (formatter).

The system, in addition to the source of coded information signals, includes means for receiving coded information signals from the source, wherever located, and for transmitting the coded signals on the facility's electrical gridwork, preferably on the neutral leg of the electrical, not fused, gridwork, for distribution to outlet receptacles and switches simultaneously with the electrical A.C. power associated with the facility.

The system also includes time or signal employing means such as appropriate time or parameter display devices, timing devices, and time or parameter-controlled devices connected to the facility's outlet receptacles, switches and the like and which can use the coded signals.

The signal receiving and transmitting means may also include, if desired, programming means for controlling the time employing means in a preselected or adoptive fashion or sequence.

The above recited object, features, and advantages of the present invention as well as others will be explained in greater detail hereinbelow with reference to the accompanying drawings.

DESCRIPTION OF PREFERRED EMBODIMENTS

Figure 1:
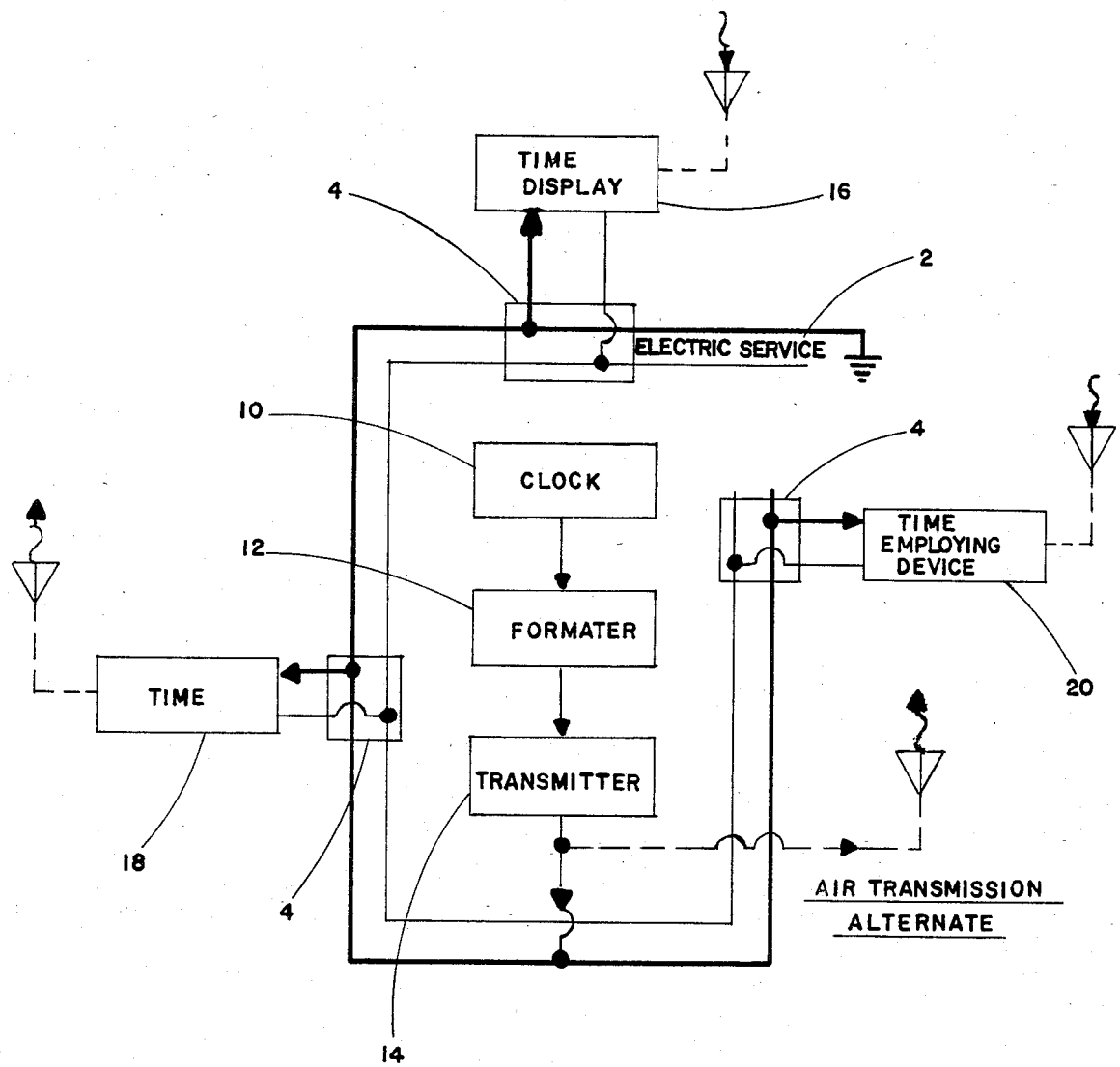
FIG. 1 is a schematic illustration of the system for distributing time information signals to a facility with multiple signal-interpreting means.

FIG. 1 illustrates in schematic form a typical system of the invention for distributing coded time signals throughout a facility having an electrical service 2 of conventional design, for example, electrical service constructed in accordance with the National Electric Code having a neutral or grounded leg which cannot be interrupted. The electrical service, of course, includes a number of outlet receptacles 4 for making electrical A.C. power available for use.

The system is shown including a clock 10 to provide a source of accurate time signals. The clock can be of conventional construction provided with an electrical signal means for producing code representing time and in the embodiment shown in FIG. 1 may be located within the facility, although the clock of course could be remote therefrom, for example, at a radio or television broadcasting source for transmission to the facility along with the radio or TV signals. The clock 10 in the embodiment shown should be integrated into the Formatter 12 which transforms the parallel digital form time signals received from the clock 10 to a serial digital form which is usable by downstream components of the system. By "parallel digital form" is meant a coded signal capable of containing multiple bits of information at a time and handled simultaneously; e.g. a coded signal in parallel digital form is used in the IBM 360 and thus is known to the art as is serial digital form which is processing information piece by piece, one bit at a time. The Formatter 12 suitable for use in the system is a data processor that digitizes information and assembles it in a serial digital code for the transmitter 14.

In many installations an "off the shelf" digital clock 10 will be used to supply information to the formatter 12. They operate on a binary code that varies with manufacturers. Therefore, conversion of the code by the formatter 12 to the representation required by the end use of the system will vary as the binary code source varies.

In a prototype a commercial digital clock 10 is used. It continuously exposes time in hours and minutes which is in its system coded in parallel digital form. That information is transferred to the formatter 12 which converts it to a serial digital form and transfers it to the transmitter 14.

Commercial Tapes are available having time sources. They may be suitable but also require a custom Formatter 12 design to be used.

Using the UTC signal as a source of time requires a totally different consideration because its time takes a full minute to receive. Therefore, The Formatter 12 must accumulate information for each minute. Seconds, miliseconds, and further breakdown of the minute if required must be supplied by the Formatter through alternative means keyed to the UTC signal for start of its counting.

The coded time signal is transmitted by the transmitter 14 to time employing devices 16, 18, 20 by their direct coupling with electrical service 2 through receptacles 4 or through radio.

The coupling to the electrical service 2 is in particular to the neutral or grounded leg. The transmission antenna is the feature used for coupling the device. It is directly connected to the grounded (wide) prong of a two prong male plug adapted for receipt in a conventional outlet receptacle in the facility.

Only the grounded (wide) prong of plug requires insertion in receptacle for successful coupling of coded signal to electrical service 2. Insertion of both prongs is necessary to provide energy to transmitter 14.

It should be noted that the coded time signal does not interfere with the A.C. power or with radio or television broadcasts being received by radios or televisions coupled to the electrical service 2. The coded time signal is a silent, non-visual program with respect to radios, televisions, or other equipment connected to and deriving power from the electrical service 2.

Of course, once the coded time signal is transmitted to the electrical service 2 by the transmitter 14, the signal is available for pick-up at each electrical outlet receptacle 4, switch (not shown) or termination points within electrical service (now shown).

The signal format received from the formatter 12 determines the design of the transmitter 14. Generally an off the shelf transmitter can be provided the additional features required for the transmitter 14 to serve the system.

The transmitter's RF carrier is modulated by the serial data it receives. Thus the time employing devices 16, 18, 20 joined to either electrical service 2 or radio assume the information of the clock 10.

Several time employing devices 16, 18, 20 are shown connected to the electrical service 2 at outlet receptacle 4. For example, a time display device 16 may be connected to one receptacle 4 and would include a display and a two prong male plug that provides energy to drive the time display 16 while also coupling the coded signal from the electrical service to the time display. The time display device 16 would include an electrical signal sensing means similar to that found in conventional clocks for transferring time information from the electrical service 2 to the time display 16 which could be a conventional light emitting diode, liquid crystal, electrochromic or other known displays. Thus, by simply plugging the time display device 16 into any receptacle 4 in the facility the time could be displayed and would correspond with that of clock 10.

Likewise, a timer device 18 could be plugged into one of the outlet receptacles 4 for controlling lights, appliances, or other equipment within the facility. The timer device 18 would include an electrical signal sensing means for transferring time information from the electrical service 2 to the timing circuit of the device.

And, one or more time employing devices 20 would be plugged into the outlet receptacles 4 and would include controlling devices such as manufacturing processes controllers, attendance clocks, security controllers, household devices, etc. that recognize and use the coded time signal directly in the facility.

The time employing devices may range from simple to that of a microprocessor. Their functions vary greatly. In general, they serve to acquire data, analyze data or control systems.

The system provides time which is the basis for measurement control and monitoring of the individual functions of the various devices.

The information of interest the device serves may take the form of mechanical displacements, pneumatic pressures, fluid flow, radiations, temperatures, etc. Any physical phenomenon can be of interest and as such may be used to generate signals of interest to the monitor.

All signals of interest must be converted to an electrical form such as voltage, current or impedance. Their value is the analog of the signal parameter being measured. The voltage signal changes in accordance with the variations of the signal it represents and is proportioned to the parameter. Similarly current or impedance variations can be used to represent the measurement parameter.

Time employing devices 16, 18, 20 provide the change in energy from one form to electrical. They convert the signal of interest to an electrical form that is measureable. Their designs would be based on a very large number of different physical phenomena.

The time employing devices may require the features of a Signal Conditioner integrated within them for converting the electric signal to a common form and range. The functions possibly required may be: voltage and current amplification, impedance transformation, calibration and referencing. The analog electronic equipment has reference powers sources that enable it to convert the electrical analog signals to a common scale and range.

The time employing devices contain or are associated with features of an Analog to Digital Converter (ADC) which converts the signals from the devices to digital representation.

Many types of time employing devices may be used with the system. These will produce many analog signals of interest. A single ADC can be shared among a number of the analog signal sources by using an analog multiplexer which is an electronic or electromechanical switch that by program control connects selected analog input channels to the ADC. The converter then produces as its output the digital representation of those channels.

There are other time employing devices that are simple in design such as items that operate on or off by setting of time at the device much like a timer or items that record operating time such as meters. There are other simple devices that provided the benefit of a continuous time source are capable of acquiring data, analyzing data, or controling systems independently.

Figure 2:
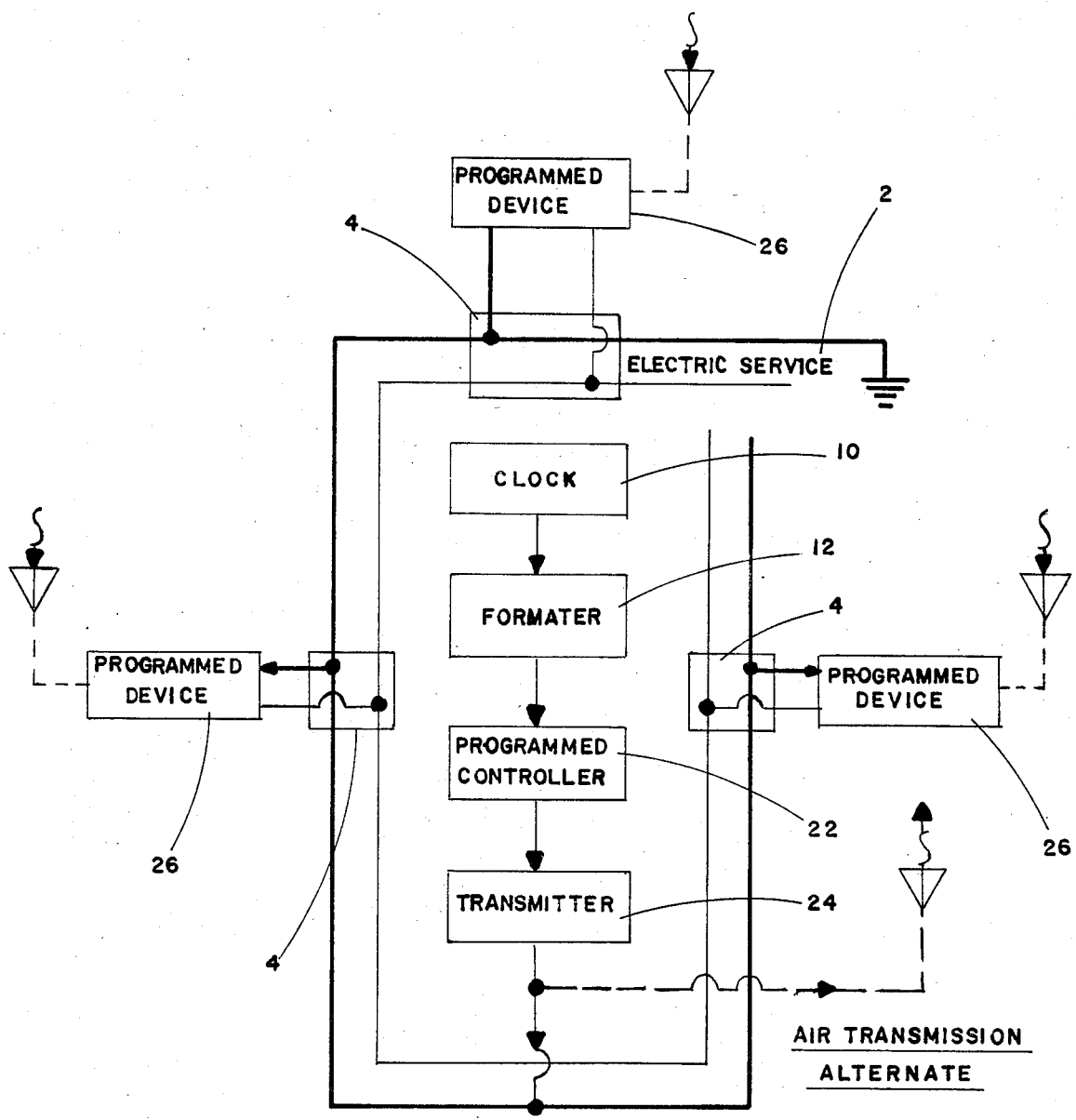
FIG. 2 is a similar to FIG. 1 with the addition of programming means to the system.

FIG. 2 illustrates another embodiment of the system similar to that shown in FIG. 1 with the addition of program controller 22 and transmitter 24. The controller 22 would program various activities or sequences of events and that information would be transmitted to the electrical service 2 by the transmitter 24 at the time activity is to occur. The programmed controller 22 comprises a memory system that would maintain an address and time schedule for activities to occur. The transmitter 24 would be activated by coded instructions received from program controller 22. When alerted transmitter 24 would transmit directions. Connected to the outlet receptacles 4 of the electrical service 2 would be programmed devices 26 that recognize the coded programs and direct equipment accordingly for the purpose of control, monitoring, and/or accounting. The purpose of exemplary of such a programmed device would be a control for traffic signals, control for manufacturing processes, control for domestic services such as lights, thermostats, etc.

Both FIGS. 1 and 2 also show that the transmitters 14 and 24, respectively, may be provided with antennae for air transmission of the coded signal to time employing devices 16, 18, 20 and 26 having antenna to pick-up the air transmission.

Figure 3:
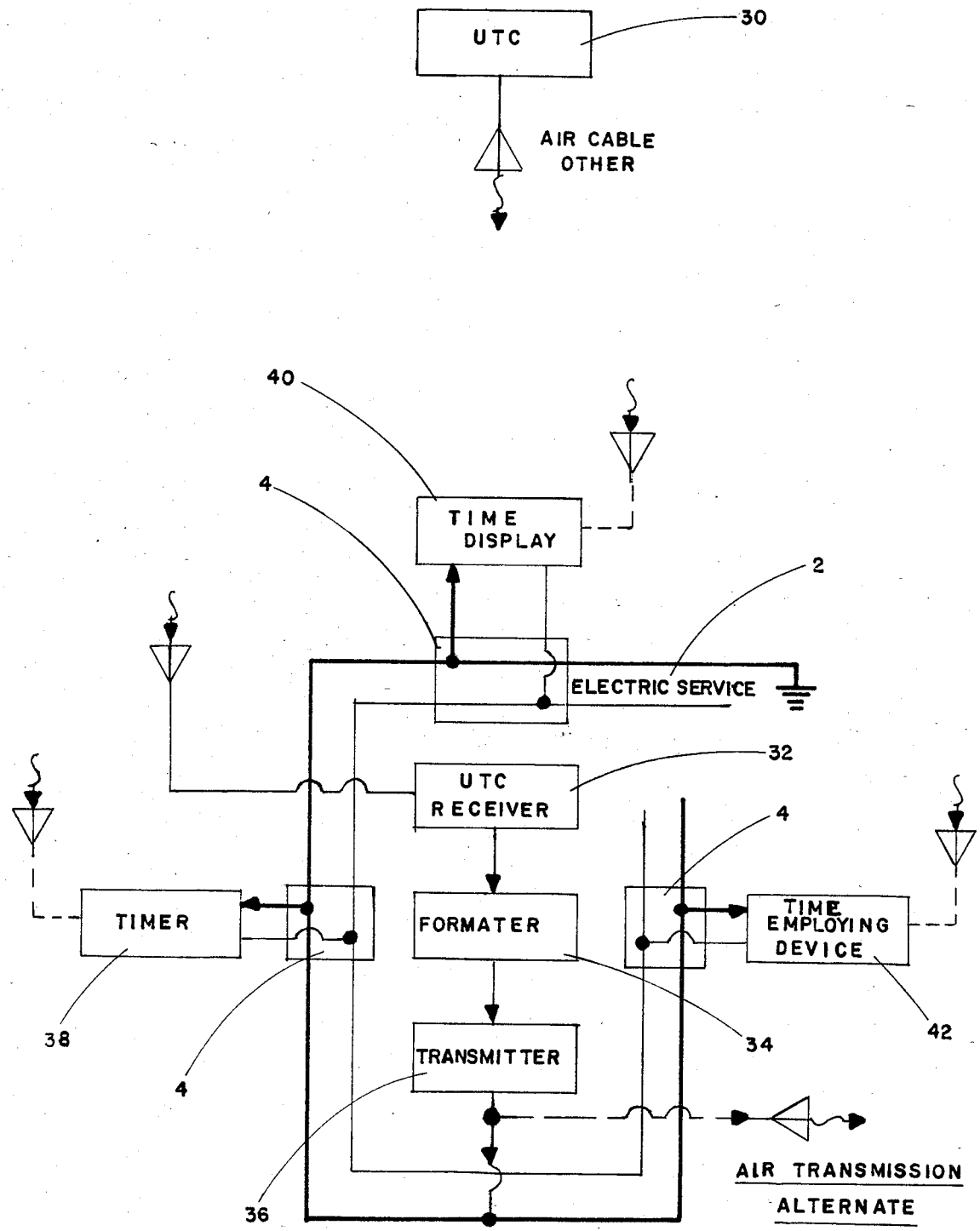
FIG. 3 is a schematic illustration of the system for distributing time information signals from a Coordinated Universal Time source to a facility.

FIG. 3 illustrates a system of the invention intended for facilities that require servicing of a number of consumers or equipment having a requirement for the ultimate accuracy of Coordinated Universal Time. For example, the master time signal would be transmitted by radio stations 30, or by cable or other means, scattered throughout the world. The system would include a UTC receiver 32 for receiving the master time signal and transferring it to the Formatter 34 which is similar to that described hereinabove with respect to FIG. 1 in that it converts the analog form to the aforementioned serial digital form representing time by hours and minutes which it then transfers to the transmitter 36 which is similar to that described hereinabove for FIG. 1 in that it transmits the time information to the electrical service 2 of the facility. Time employing devices 38, 40, 42 similar to those already described would receive the coded master time signal through outlet receptacles 4 in the electrical service 2. A highly accurate time signal is thus provided for use by the time employing devices. The time this system provides is guaranteed accurate because it is traceable to Greenwich Mean Time.

Interruption in the transmission of the UTC eliminates production of time and loss of it in the system. If time is seen or available at any point in the system it is corrected time because only correct time is transmitted.

Interruptions through loss of power would be overcome by having battery systems available to provide alternate power.

Figure 4:
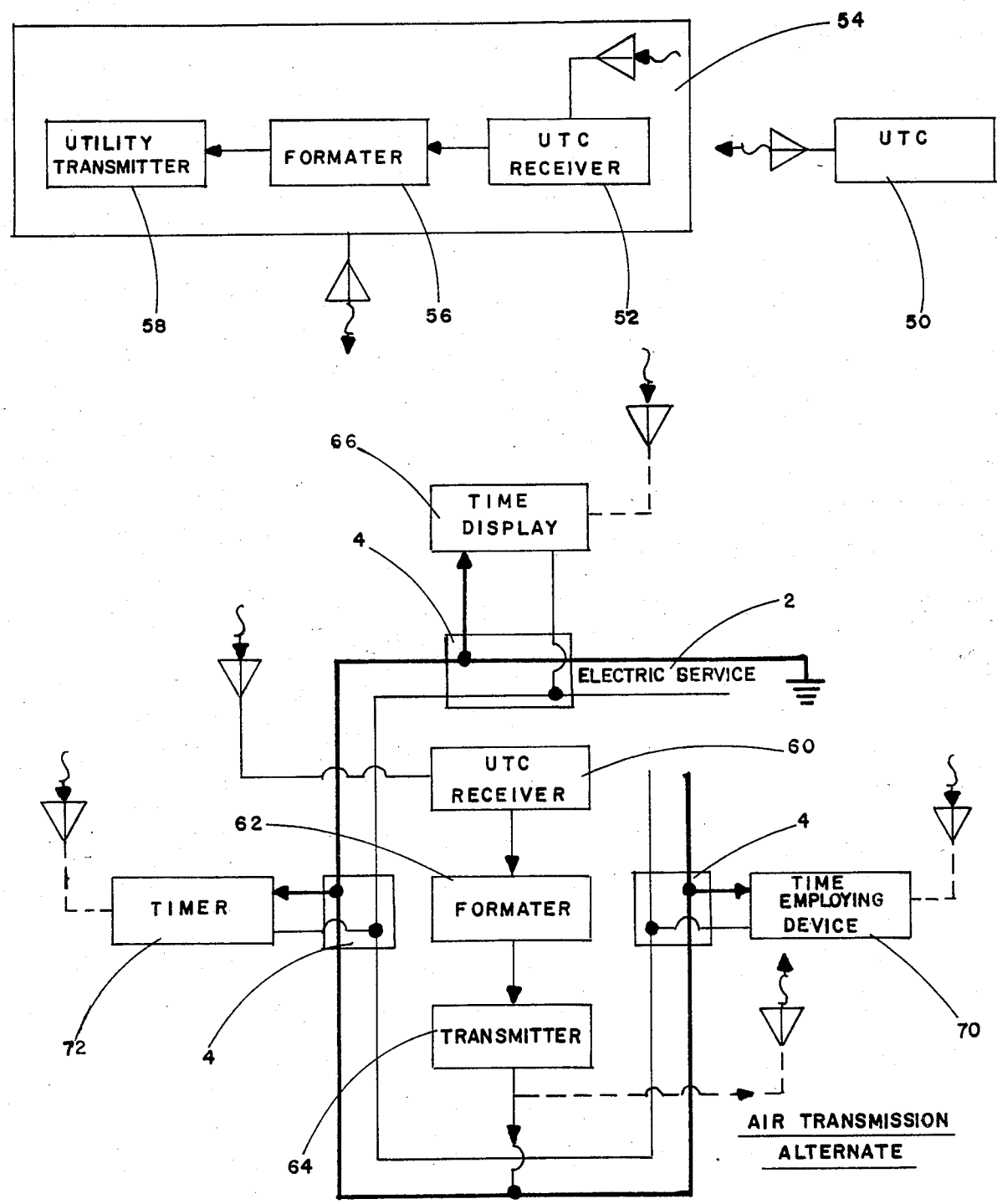
FIG. 4 is a schematic illustration of the system for distributing time information signals from a Coordinated Universal Time source via an intermediate utility station to a facility.

FIG. 4 illustrates a system of the invention intended as a utility to some large areas such as a county, state, or nation. A small number of such utilities could serve the entire world. This system would also use the coordinated Universal Time source 50 which would transmit the master time signal to the UTC receiver 52 at the utility 54.

The Receiver 42 receives and transfers the master analog time signal to the Formatter 56 which produces a serial digital signal as described hereinabove. The Utility Transmitter 58 produces an analog system that it transmits to widely dispersed facilities.

At each facility, the analog signal is received by receiver 60 comprising a radio receiver and a feature that transfers the analog code it receives to the Formatter 62 which converts it to serial digital code described hereinabove. The transmitter 64 transmits the coded master time signal to electrical service 2 as described hereinabove for use by the time employing devices 66, 70, 72.

As with system in FIG. 3 the FIG. 4 system also provides a guarantee that time it provides is accurate because it is traceable to Greenwich Mean Time.

Interruption in the transmission of UTC eliminates production of time and loss of it in the system. If time is seen or available at any point in the system, it is correct time because only correct time is transmitted.

Interruption through loss of power are overcome by having battery systems available to provide alternate power.

Of course, the systems shown in FIGS. 3 and 4 can be provided with programmed controllers and programmed transmitters at the facility and/or at the utility to provide programmed activities to multiple users and/or facilities.

As those skilled in the art the systems described hereinabove could have numerous advantages uses including, but not limited to, those listed here below:

(a) as a standard time reporting system for use by regions, states, nations and the world.
(b) as a means to provide time displays in lieu of conventional clocks or other timepieces.
(c) as a means for reporting of frequencies of occurences or events, or cycles of operations in remote locations.
(d) as a means for controlling devices and replacing conventional timers found on household equipment such as washers, dryers, stoves, etc.
(e) as a means for controlling devices such as machine tools, processing equipment, inspection and monitoring equipment, and consumer products which now use timers or programmers attached or associated therewith.
(f) as devices for use by surface, sea and air transportation vehicles (facilities) having an electrical gridwork for monitoring and controlling various systems and time displays thereon.
(g) as a basis for computer and processor systems.
(h) as a basis for navigation systems.

The basis for all principle navigation systems is time.
1. Celestial navigation determines position of ships or aircraft by shooting the stars and/or moon with a SEXTANT. Exact Greenwich Mean Time at the very instant of shooting is required to complete computation of position.
2. "Great Circle Navigation" is the shortest distance between two points and is used in both sea and air travel. It is accomplished by making numerous course changes and maintaining each course for a closely controlled time.
3. Dead Reckoning navigation is the plotting of various courses on charts and maintaining them at a particular speed for a closely controlled time.
4. Depth of water below ship is found by measuring the length of time a signal travels from the hull of the ship to the bottom of the water and back. Commercial depth finders use this feature.

Figure 5:
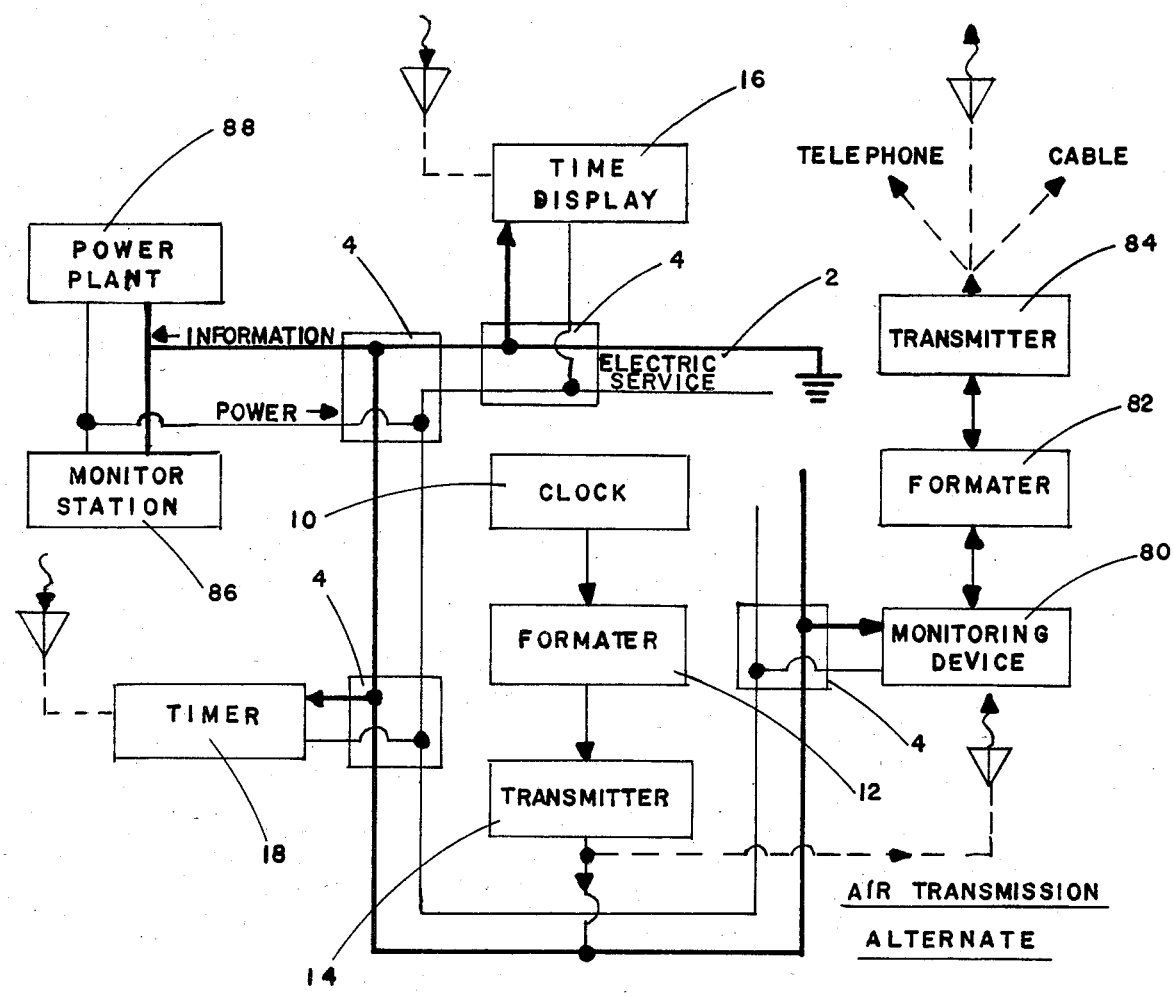
FIG. 5 is a schematic illustration of the system where time employing devices are used with monitoring means.

Another aspect of the invention system is its adaptability for transmission of information from the location of the monitoring device 80, for example, a gas, water, or electric meter, fire detection device, security device, or process sensor device, to a third location to enable monitoring and for control thereof. In such an arrangement, see FIG. 5, the meter monitoring device 80 provides its information to Formatter 82 which appropriately codes the information similar to that described hereinabove for FIG. 1.

Coded information is transferred to Transmitter 84 which delivers information similar to that described hereinabove via the electrical service or air. In addition, telephone and cable are alternate means of transmitting information.

Information terminates at a remote monitor station 86 having memory (information & addresses) to compare coded signal with. Accounting or adoptive control functions are thus possible.

Remote location for monitoring information would be main power generating station 88 or monitor station 86 having access to the main power distribution system that supplies power to the location containing the monitoring device 80.

Of course, sensors of temperature, pressure, volume, velocity, density, flow, chemical composition, electrical parameters and the like can be used in lieu of the master clock discussed in the above embodiments to provide systems of the invention which distribute such information for use in the same manner that time information is distributed in the above embodiments.

As used hereinabove and in the claims which follow, the term "electrical gridwork" should be understood to include not only the electrical service described in FIGS. 1-5 but also other grounded systems which may include, but are not limited to, the plumbing system, telephone system, cable system and the like within or operatively associated with a facility.

Those skilled in the art will appreciate that certain preferred embodiments of the invention have been illustrated and that it is within the scope of the invention to make change, modifications and the like thereto within the scope of the apprended claims.

I claim:

1. A system for distributing changing parameter information such as changing time, pressure, temperature, volume, velocity, density, flow, composition or like parameter information through a facility having an electrical gridwork with a plurality of outlets and a neutral or ground leg, comprising a source for generating coded electrical signals representative of changes in the parameter information, means at the facility for receiving the signals from the source and transmitting the signals in coded form through the facility on the leg as an antenna, and a plurality of signal employing means at the facility each connected to a respective one of the outlets and thereby coupled to the leg for receiving the same signals from the transmitting means representative of the same changes in the parameter information and carrying out same or different functions using said same signals.

2. A system for distributing changing time information through a facility having an electrical gridwork with a plurality of outlets and a neutral or ground leg, comprising a source for generating coded electrical signals representative of sequential changes in the time information, means at the facility for receiving the signals from the source and transmitting the signals in coded form through the facility on the leg as an antenna, and a plurality of time signal-employng means at the facility each connected to a respective one of the outlets and thereby coupled to the leg for receiving the same signals from the transmitting means and carrying out same or different functions using said same signals.

3. The system of claim 2 wherein the source of time signals includes a time source remote from the facility and a code-generating means at the facility for generating the coded electrical signals.

4. The system of claim 2 wherein the source of time signals includes a time source and a code-generating means at the facility for generating the coded electrical signals.

5. The system of claim 2 wherein the time signal-employing means is a time display device and the plurality thereof display the same time because they receive the same signal.

6. The system of claim 2 which further comprises means associated with the signal receiving and transmitting means for transmitting the signals to still another location remote from the facility.

7. A system for distributing changing time information through a facility having an electrical gridwork with a plurality of outlets and a neutral or ground leg comprising a source of standard changing time signals remote from the facility, code-generating means at the facility for receiving the standard time signals and converting the signals to a coded form, transmitting means in the facility for receiving the signals in coded form from the code-generating means and transmitting the coded time signals through the facility on the leg as an antenna, and a plurality of time signal-employing means at the facility each connected to a respective one of the outlets and thereby coupled to the leg for receiving the same coded time signals from the transmitting means and carrying out same or different functions using said same coded time signals including displaying the time information represented by the signals.

8. A system for distributing changing parameter information such as changing time, pressure, temperature, volume, velocity, density, flow, composition or like changing parameter information through a facility, comprising a source for generating coded electrical signals representative of changes in the parameter information, means at the facility for receiving the signals from the source and transmitting the signals in coded form through the facility, a plurality of signal employing means at the facility for receiving the same signals from the transmitting means representative of the same changes in the parameter information and carrying out same or different functions using said same signals, monitoring means for monitoring the function of a signal employing means and a monitoring station remote from the facility, said monitoring means including means for generating a coded electrical monitoring signal representative of the function of said signal employing means and transmitting the monitoring signal to the remote monitoring station.

* * * * *